United States Patent
Dighe et al.

(10) Patent No.: US 10,325,003 B2
(45) Date of Patent: *Jun. 18, 2019

(54) CONFIGURATION RESOLUTION FOR TRANSITIVE DEPENDENCIES

(71) Applicant: Walmart Apollo, LLC, Bentonville, AR (US)

(72) Inventors: Prashant Dighe, Cupertino, CA (US); Bhanu Cherukumille, Fremont, CA (US); Niraj K. Agarwal, Dublin, CA (US); Brian M. Johnson, Santa Clara, CA (US); Soumen Sarkar, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,883

(22) Filed: Jan. 29, 2018

(65) Prior Publication Data

US 2018/0165376 A1 Jun. 14, 2018

Related U.S. Application Data

(63) Continuation of application No. 14/530,346, filed on Oct. 31, 2014, now Pat. No. 9,881,098.

(51) Int. Cl.
*G06F 16/958* (2019.01)

(52) U.S. Cl.
CPC .......... *G06F 16/986* (2019.01); *G06F 16/958* (2019.01)

(58) Field of Classification Search
CPC ............. G06F 17/30896; G06F 16/986; G06F 16/958; H04L 41/0816

USPC ......................................................... 709/221
See application file for complete search history.

(56) References Cited

U.S. PATENT DOCUMENTS

| 7,461,374 | B1 | 12/2008 | Balint et al. |
| 7,574,692 | B2 | 8/2009 | Herscu |
| 8,037,453 | B1 | 10/2011 | Zawadzki |
| 8,082,294 | B2 | 12/2011 | Krahulec |

(Continued)

OTHER PUBLICATIONS

Oracle, "The Java EE 5 Tutorial," Jun. 2010, docs.oracle.com/javaee/5/tutorial/doc/javaeetutorial5.pdf p. 39-63.

*Primary Examiner* — Hua Fan
*Assistant Examiner* — Binod J Kunwar
(74) *Attorney, Agent, or Firm* — Bryan Cave Leighton Paisner LLP

(57) ABSTRACT

A method including: receiving at a server a first request from a first provider to retrieve a first configuration for a first lookup order; determining the first configuration for the first lookup order using the server based at least in part on both an ordering specified by the first lookup order and the first call being through the direct dependency relationship; providing the first configuration to the first provider; receiving at the server a second request from the first provider to retrieve a second configuration for a second lookup order; determining the second configuration for the second lookup order using the server based at least in part on both an ordering specified by the second lookup order and the second call to the first provider by the application being through the transitive dependency relationship; and providing the second configuration to the first provider. Other embodiments are described.

20 Claims, 7 Drawing Sheets

(56) References Cited

U.S. PATENT DOCUMENTS

| | | | |
|---|---|---|---|
| 8,255,357 B1* | 8/2012 | Heimbach | G06F 21/604 |
| | | | 707/609 |
| 8,627,286 B2 | 1/2014 | Feigen | |
| 9,268,592 B2 | 2/2016 | Hassine et al. | |
| 9,336,021 B2 | 5/2016 | Johnson et al. | |
| 2002/0147903 A1 | 10/2002 | Hubert et al. | |
| 2006/0179042 A1 | 8/2006 | Bram et al. | |
| 2006/0242183 A1* | 10/2006 | Niyogi | G06F 9/44505 |
| 2008/0178075 A1* | 7/2008 | Trethaway | G06F 21/6227 |
| | | | 715/255 |
| 2008/0235611 A1* | 9/2008 | Fraley | G06F 9/44505 |
| | | | 715/772 |
| 2009/0006416 A1* | 1/2009 | Krahulec | G06F 17/30893 |
| 2009/0125612 A1 | 5/2009 | Rabetge | |
| 2010/0198948 A1 | 8/2010 | Yang | |
| 2011/0173605 A1 | 7/2011 | Bourne | |
| 2011/0276948 A1 | 11/2011 | Tripp | |
| 2012/0078865 A1* | 3/2012 | Channing | G06F 16/2438 |
| | | | 707/703 |
| 2013/0067456 A1 | 3/2013 | Khilnani et al. | |
| 2013/0318520 A1 | 11/2013 | Abuelsaad et al. | |
| 2013/0325885 A1* | 12/2013 | Levy | G06F 9/44505 |
| | | | 707/758 |
| 2014/0019597 A1* | 1/2014 | Nath | H04L 41/0843 |
| | | | 709/220 |
| 2014/0095676 A1 | 4/2014 | Beno et al. | |
| 2014/0196122 A1* | 7/2014 | Dar | H04L 63/08 |
| | | | 726/4 |

* cited by examiner

CONFIGURATION RESOLUTION FOR TRANSITIVE DEPENDENCIES

CROSS-REFERENCE TO RELATED APPLICATIONS

This application is a continuation of U.S. patent application Ser. No. 14/530,346, filed Oct. 31, 2014. U.S. patent application Ser. No. 14/530,346 is incorporated herein by reference in its entirety.

TECHNICAL FIELD

This disclosure relates generally to software development and deployment, and relates more particularly to configuration resolution for transitive dependencies.

BACKGROUND

In various web applications, application dependencies, including transitive dependencies, are generally packaged along with their respective configurations at the time of deployment. Yet it is often difficult to know the appropriate configuration settings, particularly for transitive dependencies, at the time of deployment. As a result, applications often result in having fairly static configurations with various possible errors in configuration settings.

BRIEF DESCRIPTION OF THE DRAWINGS

To facilitate further description of the embodiments, the following drawings are provided in which.

Figure 1:
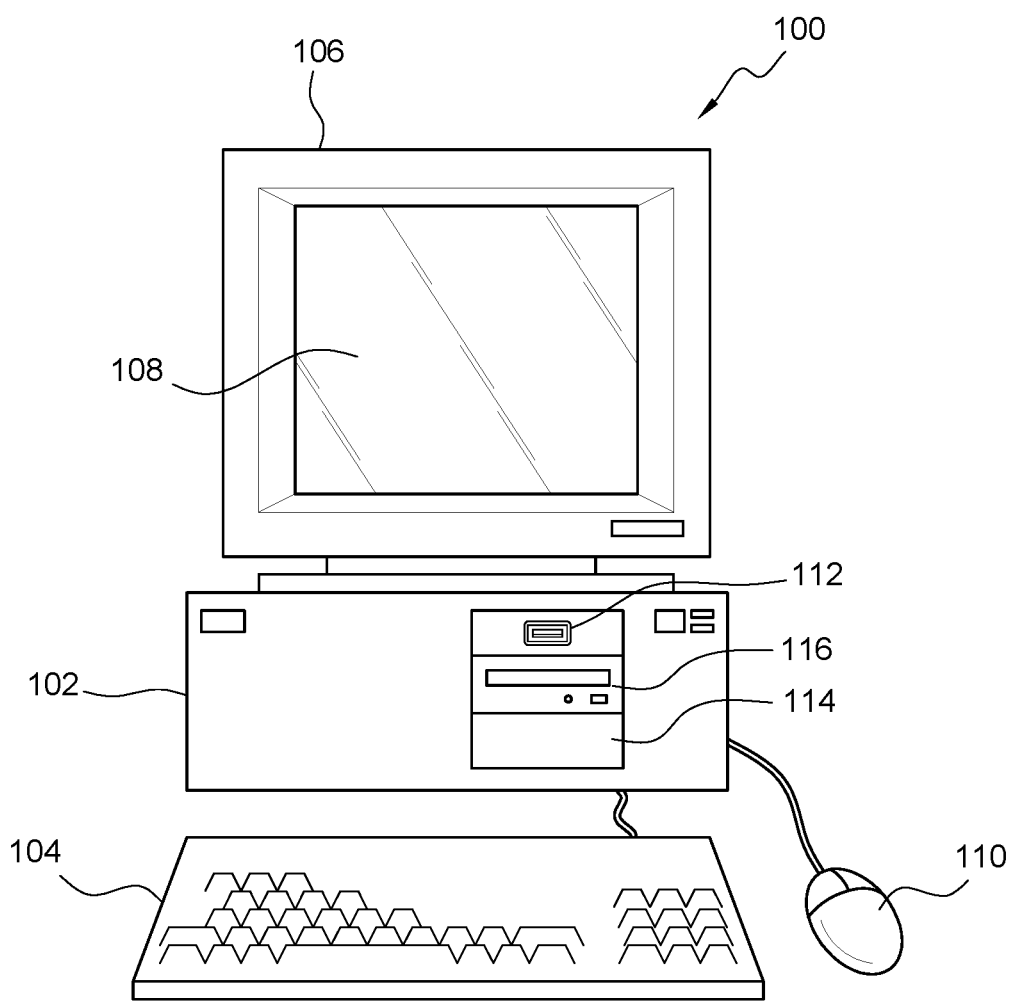
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method. The method can include receiving on a server a request from a first provider to retrieve a configuration for a lookup order. The first provider can be configured to be called directly by an application such that the application has a direct dependency relationship with the first provider. The first provider can be configured to be called by the application through a second provider such that the application has a transitive dependency relationship with the first provider through the second provider. The request from the first provider can be received when the first provider is called by the application through one of the direct dependency relationship or the transitive dependency relationship. The method also can include determining the configuration for the lookup order using the server based at least in part on whether the call to the first provider by the application is through the direct dependency relationship or through the transitive dependency relationship. The method further can include providing the configuration for the lookup order to the first provider. The method additionally can include receiving first information at the application that is based at least in part on the configuration for the lookup order. The method further can include providing second information for at least a portion of a web page that is based at least in part on the first information.

A number of embodiments include a system. The system can include one or more processing modules and one or more non-transitory memory storage modules storing computing instructions configured to run on the one or more processing modules and perform certain acts. The acts can include receiving on a server a request from a first provider to retrieve a configuration for a lookup order. The first provider can be configured to be called directly by an application such that the application has a direct dependency relationship with the first provider. The first provider can be configured to be called by the application through a second provider such that the application has a transitive dependency relationship with the first provider through the second provider. The request from the first provider can be received when the first provider is called by the application through one of the direct dependency relationship or the transitive dependency relationship. The acts also can include determining the configuration for the lookup order based at least in part on whether the call to the first provider by the application is through the direct dependency relationship or through the transitive dependency relationship. The acts further can include providing the configuration for the lookup order to the first provider. The acts additionally can include receiving first information at the application that is based at least in part on the configuration for the lookup order. The acts further can include providing second information for at least a portion of a web page that is based at least in part on the first information.

Several embodiments include a method. The method can include receiving on a server a request from a first provider to retrieve a configuration for a lookup order. The first provider can be configured to be called directly by an application such that the application has a direct dependency relationship with the first provider. The first provider can be configured to be called by the application through a second provider such that the application has a transitive dependency relationship with the first provider through the second provider. The request from the first provider can be received when the first provider is called by the application through one of the direct dependency relationship or the transitive dependency relationship. The request can include the lookup order. The lookup order can specify an ordering of one or more predefined configurations from which to determine configuration settings to be used based on the ordering. The method also can include determining the configuration for the lookup order using the server based at least in part on both: (a) the ordering specified by the lookup order, and (b) whether the call to the first provider by the application is through the direct dependency relationship or through the transitive dependency relationship, such that the configuration determined for the lookup order can be different when the lookup order and the ordering specified by the lookup order are different, and such that the configuration determined for the lookup order is different when the call to the first provider by the application is through the direct dependency relationship versus when the call to the first provider by the application is through the transitive dependency relationship. The method additionally can include providing the configuration for the lookup order to the first provider.

Some embodiments include a system. The system can include one or more processors and one or more non-transitory computer-readable media storing computing instructions configured to run on the one or more processors and perform certain acts. The acts can include receiving on a server a request from a first provider to retrieve a configuration for a lookup order. The first provider can be configured to be called directly by an application such that the application has a direct dependency relationship with the first provider. The first provider can be configured to be called by the application through a second provider such that the application has a transitive dependency relationship with the first provider through the second provider. The request from the first provider can be received when the first provider is called by the application through one of the direct dependency relationship or the transitive dependency relationship. The request can include the lookup order. The lookup order can specify an ordering of one or more predefined configurations from which to determine configuration settings to be used based on the ordering. The acts also can include determining the configuration for the lookup order using the server based at least in part on both: (a) the ordering specified by the lookup order, and (b) whether the call to the first provider by the application is through the direct dependency relationship or through the transitive dependency relationship, such that the configuration determined for the lookup order can be different when the lookup order and the ordering specified by the lookup order are different, and such that the configuration determined for the lookup order is different when the call to the first provider by the application is through the direct dependency relationship versus when the call to the first provider by the application is through the transitive dependency relationship. The acts additionally can include providing the configuration for the lookup order to the first provider.

Figure 2:
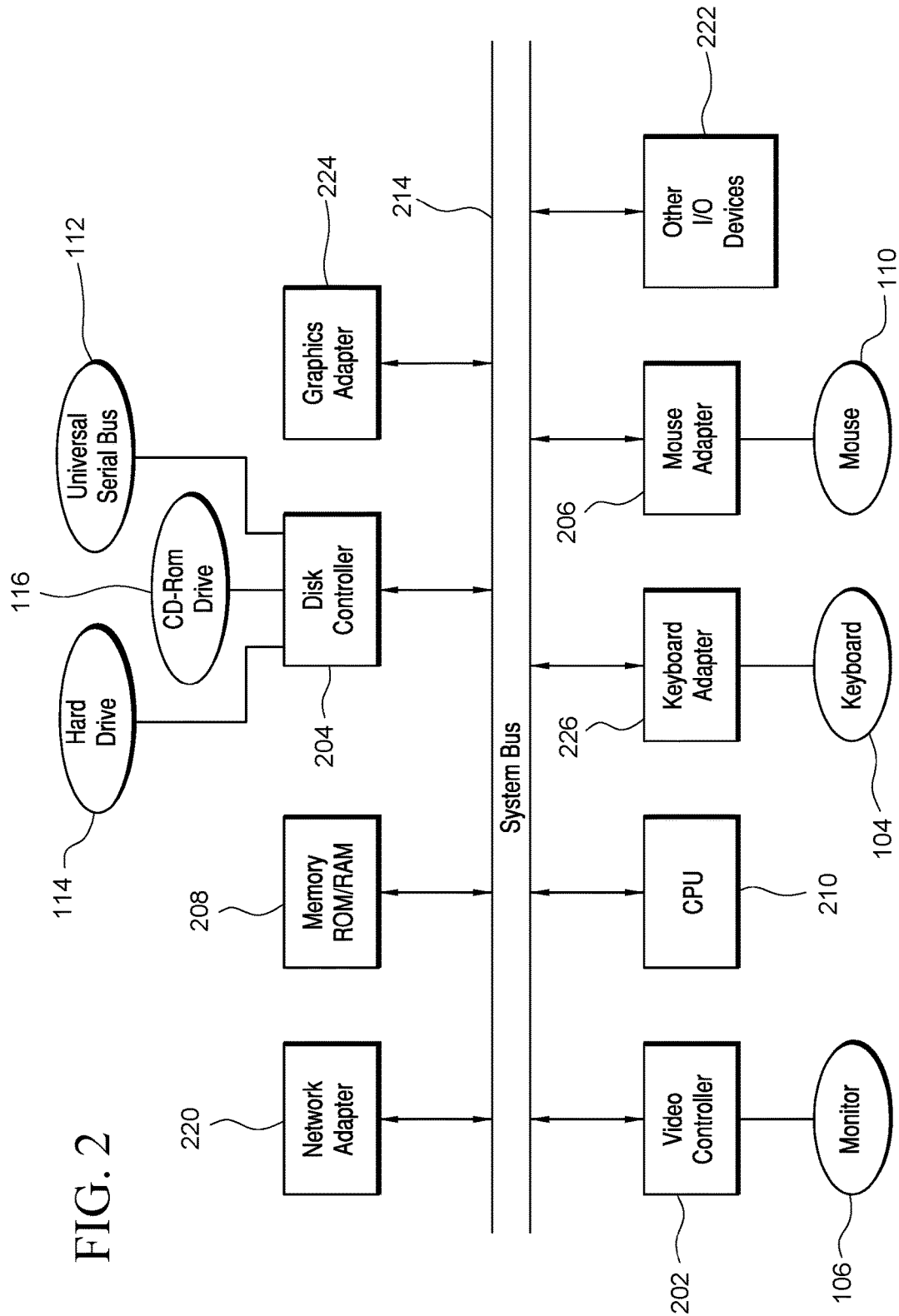
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
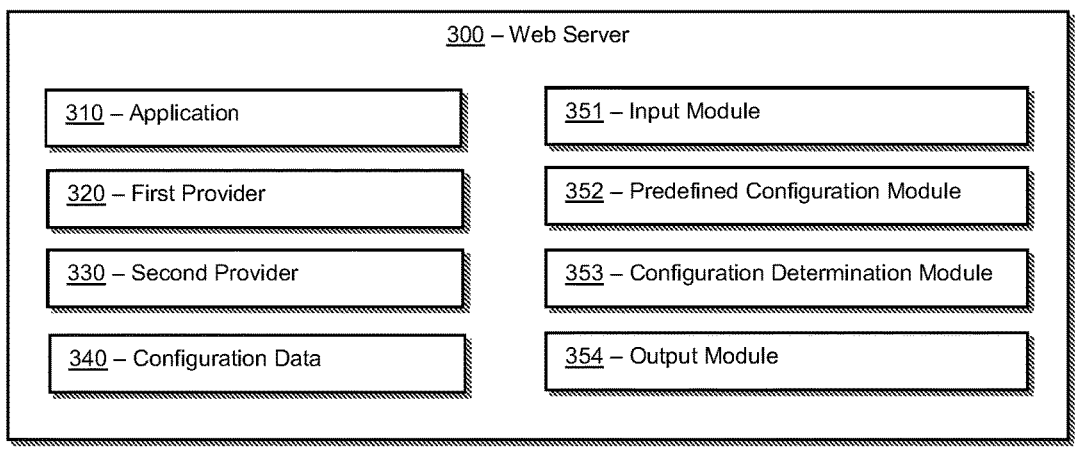
FIG. 3 illustrates a block diagram of a web server, which can be employed for configuration resolution, according to an embodiment.

Turning ahead in the drawings, FIG. 3 illustrates a block diagram of a web server 300, which can be employed for configuration resolution, according to an embodiment. Web server 300 is merely exemplary, and embodiments of the web server and elements thereof are not limited to the embodiments presented herein. The web server and elements thereof can be employed in many different embodiments or examples not specifically depicted or described herein. In some embodiments, certain elements or modules of web server 300 can perform various procedures, processes, and/or activities. In other embodiments, the procedures, processes, and/or activities can be performed by other suitable elements or modules of web server 300.

In many embodiments, web server 300 can be a computer system, such as computer system 100 (FIG. 1), as described above, and can each be a single computer, a single server, or a cluster or collection of computers or servers, or a cloud of computers or servers. In a number of embodiments, web server 300 can include an application 310, a first provider 320, a second provider 330, and/or configuration data 340. In many embodiments, application 310 can be dependent upon first provider 320 and/or second provider 330. For example, first provider 320 and/or second provider 330 can be services, libraries, and/or other dependencies included in application 310, which can provide a service to application 310. In many embodiments, application 310 can be dependent upon additional and/or other providers, which can be similar to first provider 320 and/or second provider 330. In some embodiments, configuration data 340 can store configuration data for application 310, first provider 320, and/or second provider 330.

In various embodiments, web server 300 can include one or more modules, such as modules 351-354, which are described below in further detail. In many embodiments, web server 300 can interface with users through display windows, which can be displayed on a screen, such as screen 108 (FIG. 1). In some embodiments, the display windows can be any form of display suitable for interfacing with the users. In many embodiments, the display windows can be presented in the form of a graphical user interface that allows the users to interact with application 310. In some embodiments, the display windows can be provided through a web based service in the form of one or more web pages that the users can interact with to perform the same or other functions. In a number of embodiments, the display windows can be provided through a stand-alone software application, and can display graphical output associated with the software application.

Figure 4:
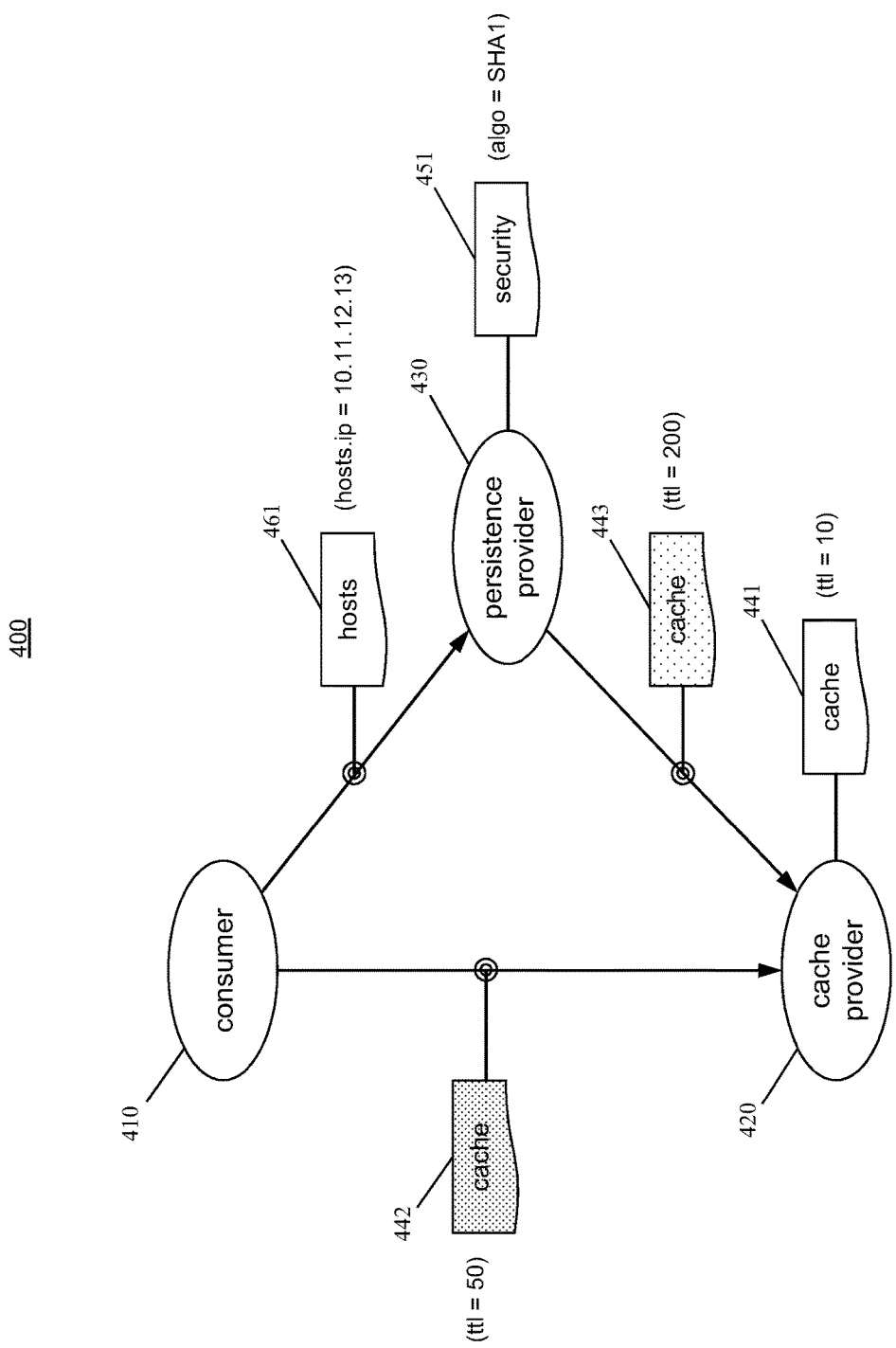
FIG. 4 illustrates a block diagram of an exemplary dependency graph, according to an embodiment.

Turning ahead in the drawings, FIG. 4 illustrates a block diagram of an exemplary dependency graph 400, according to an embodiment. Dependency graph 400 is merely exemplary and embodiments of the dependency graph are not limited to the embodiments presented herein. The dependency graph can be employed in many different embodiments or examples not specifically depicted or described herein. Dependency graph 400 can depict an application, such as a web application, dependencies for the application and/or configurations for the application. For example, in a Java or Java Enterprise Edition (Java EE) web application, application dependencies and their transitive dependencies can be packaged along with their respective configurations as an enterprise application archive file (EAR file) or a web application archive file (WAR file). The packaging can be done by an Application Deployer and Administrator, who can be denoted as simply the administrator. Generally, the administrator can configure the web application for the operational environment by modifying a deployment descriptor of the web application. The deployment descriptor can be a configuration file, which can specify configuration settings for the web application when it is deployed on to one or more servers, such as web server 300 (FIG. 3).

Dependency graph 400 in FIG. 4 can depict an exemplary WAR file, such as consumer.war. For example, dependency graph 400 can include an application, such as consumer 410; a first provider 420, such as cache provider 420; and a second provider, such as persistence provider 430. Consumer 410 can be similar or identical to application 310 (FIG. 3); cache provider 420 can be similar or identical to first provider 320 (FIG. 3); and/or persistence provider 430 can be similar or identical to second provider 330 (FIG. 3). Consumer 410 can be an application, which can be dependent on and/or consume various resources, such as cache provider 420 and persistence provider 430. In a number of embodiments, cache provider 420 and/or persistence provider 430 can be libraries and/or other dependencies. In general terms, consumer 410 can be said to be a consumer, as it uses services provided by one or more providers. Cache provider 420 and persistence provider 430 can be said to be providers, as they can be libraries or dependencies that provide various services to consumer 410.

In a number of embodiments, consumer 410 can make one or more procedure calls to cache provider 420, and thus can be said to be directly dependent on cache provider 420. In other words, consumer 410 and cache provider 420 can be said to have a direct dependency relationship. In a number of embodiments, consumer 410 can make one or more procedure calls to persistence provider 430, and thus can be said to be directly dependent on persistence provider 430. In many embodiments, persistence provider 430 can in turn be dependent on cache provider 420. Consumer 410 can thus be transitively dependent on cache provider 420 through persistence provider 430. In other words, consumer 410 and cache provider 420 can be said to have a transitive dependency relationship. When cache provider 420 is called directly by consumer 410, consumer 410 can be said to be the client of cache provider 420, as consumer 410 is the immediate caller of cache provider 420. When cache provider 420 is called by persistence provider 430, persistence provider 430 can be said to be the client of cache provider 420, as persistence provider 430 is the immediate caller of cache provider 420.

The various components of a web application, such as consumer 410, cache provider 420, and persistence provider 430, can provide and/or require various different configuration settings. For example, cache provider 420 can use a cache setting 441, which can be a time to live (ttl) setting of 10. In many embodiments, cache setting 441 can be a default setting for cache provider 420, and the cache setting can be modified, such as by consumer 410 and/or persistence provider 430. For example, when persistence provider 430 uses cache provider 420, it can be advantageous for the cache setting to be set to a different cache setting, such as cache setting 443. Cache setting 443 can have a ttl setting of 200. In some embodiments, cache setting 443 can be the optimal cache setting when persistence provider 430 calls cache provider 420. As another example, when consumer 410 uses cache provider 420, it can be advantageous for the cache setting to be set to a different cache setting, such as cache setting 442. Cache setting 442 can have a ttl setting of 50. In some embodiments, cache setting 442 can be the optimal cache setting when consumer 410 calls cache provider 420. In a number of embodiments, the optimal settings for a configuration setting can conflict across the different dependencies, such as, for example, cache setting 442 conflicting with cache setting 443.

As a further example, persistence provider 430 can use a security setting 451, which can be an encryption algorithm (algo) setting of SHA1 (Secure Hash Algorithm-1). In some embodiments, it can be advantageous for security setting 451 to be provided by persistence provider 430 in such a way that it cannot be overridden.

In a still further example, persistence provider 430 can use a hosts setting 461. In many embodiments, hosts setting 461 can be a host internet protocol (IP) address of a database, which can be unknown by persistence provider 430 until it is provided by consumer 410 and/or those deploying consumer 410 as a web application. For example, hosts setting 461 can be a hosts internet protocol (IP) address of 10.11.12.13. In many embodiments, hosts setting 461 can have no default setting.

Under conventional procedures for packaging and deploying web applications, the components of the web application, such as consumer 410, cache provider 420, and/or persistence provider 430 can provide default settings for configuration settings and/or leave various configuration settings undefined. The administrator then defines the undefined settings at the time of deployment. The administrator also can change the default configuration settings at the time of deployment. Under this conventional approach, the resulting web application can have a kind of static configuration. This conventional approach can have several drawbacks. For example, because the configuration settings generally need to be defined at the time of deployment, changes at runtime are generally not possible without a re-build and re-deploy, or at least a re-deploy.

Another drawback of the conventional approach can be that an application that has already been assembled can require tweaking in order to inject configuration settings, which can be cumbersome and/or require additional tools. Additionally, there can be no easy way to define multiple different configurations when a dependency is being used by the consumer and a provider, or by multiple providers.

As yet another example of a drawback of the convention approach, provider libraries that are packaged with the application can need to be configured by the administrator, regardless of whether the administrator is trained or otherwise has expertise for such provider configurations. Because an administrator can be required to provide configuration settings despite the lack of expertise, the convention approach can lead to various configuration errors or suboptimal configuration settings. Furthermore, transitive dependencies, which are dependencies introduced by the providers, can also need to be configured by the administrator. Yet the administrator often does not know what settings are appropriate or optimal for the providers that are called through transitive dependencies. For example, the administrator who packages consumer 410 may know how to configure the cache settings for the use of cache provider 420 by consumer 410, but may not how the cache settings should be configured for the use of cache provider 420 by persistence provider 430. This problem can be particularly acute for the providers that are called only through transitive dependencies, as the administrator may not know anything about such providers.

Still further, providers can be unable to restrict consumers and/or administrators from overriding configuration settings under the conventional approach. Moreover, it can be difficult or even impossible under the convention approach for providers to force the consumer and/or administrator to provide configuration settings when the defaults do not make practical sense. Furthermore, the conventional approach can make it difficult or impossible for a provider at runtime to take control of a configuration that has been overridden by a consumer.

In many embodiments, the systems and methods for configuration resolution described herein can advantageously eliminate the need for performing the lifecycle steps of edit, re-build, and re-deploy when changing the configuration under the conventional approach. In several embodiments, the systems and methods described herein can beneficially remove the static binding of dependencies and their configurations. In a number of embodiments, the system and methods described herein can provide application programming interfaces (APIs) for providers to take full control of their configuration resolution process.

Figure 5:
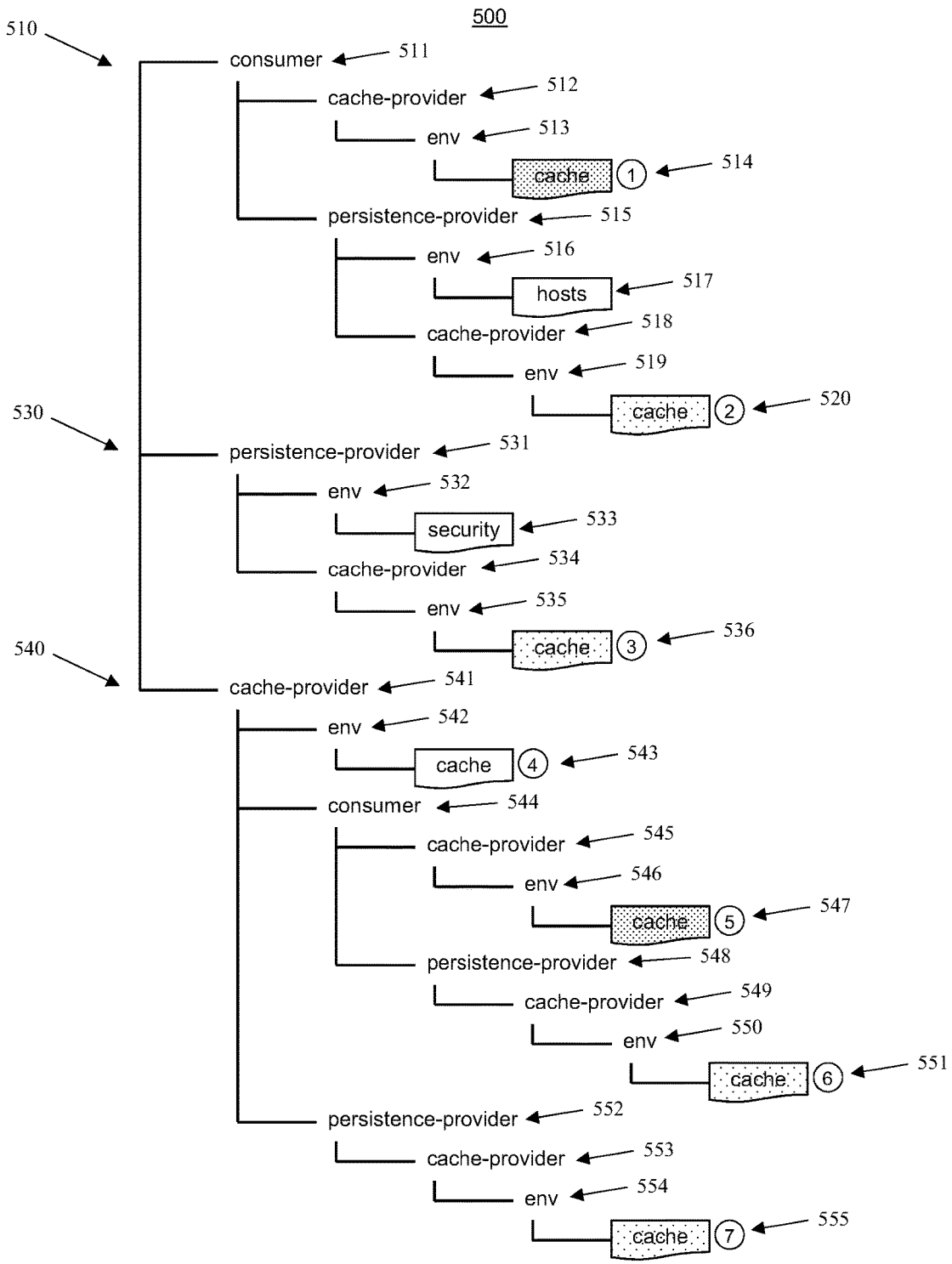
FIG. 5 illustrates a tree view of configurations stored in a hierarchical manner, according to the embodiment of FIG. 4.

Turning ahead in the drawings, FIG. 5 illustrates a tree view of configurations 500 stored in a hierarchical manner, according to the embodiment of FIG. 4. Configurations 500 are merely exemplary, and embodiments of configuration resolution can be employed in many different embodiments or examples not specifically depicted or described herein. In a number of embodiments, configurations 500 can be stored in configuration data 340 (FIG. 3). In several embodiments, configuration 500 can be stored on a server, such as web server 300 (FIG. 3). In many embodiments, configurations 500 can be stored on the server in a hierarchical manner, as shown in FIG. 5. For example, configurations can be stored as an XML document, or in another suitable hierarchical tree format.

In some embodiments, configurations 500 can include sets of configurations that are defined by each of the components of the web application. For example, configurations 500 can correspond to dependency graph 400 in FIG. 4, and can include a set of configurations defined by consumer 410 (FIG. 4), such as consumer configurations 510; a set of configurations defined by persistence provider 430 (FIG. 4), such as persistence-provider configurations 530; and/or a set of configurations defined by the cache provider 420 (FIG. 4), such as cache-provider configurations 540. In other embodiments, configurations 500 can include other configurations for other dependencies.

In many embodiments, each of the set of configurations (e.g., 510, 530, 540) can be rooted at a root level node that matches the component that defined the values in the node. For example, in consumer configurations 510, a consumer node 511 can be the root level node, and all the configurations in consumer configurations 510 can be set by consumer 410 (FIG. 4). Throughout this disclosure, when a configuration is said to be set by a component, it is to be understood that the configuration can be set by the component, the developers of the component, and/or an administrator for the component.

In several embodiments, the set of configurations (e.g., 510, 530, and/or 540) can include an environment with configuration settings and/or subtrees having an environment with configuration settings. For example, consumer configurations 510 can include a cache-provider node 512, which can root a subtree that includes configuration settings for when consumer 410 (FIG. 4) is using cache-provider 420 (FIG. 2). The subtree can include an environment node 513, under which there can be one or more configurations, such as configuration 514. In many embodiments, configuration 514 can be similar to cache setting 442 (FIG. 4), and can be the cache setting specified by consumer 410 (FIG. 4) when consumer 410 (FIG. 4) is using cache provider 420 (FIG. 4). Under the configuration resolution approach described herein, the cache setting used by cache provider 420 (FIG. 4) can be different based on various factors, such as which component defined the cache setting, which component or components are calling cache provider 420 (FIG. 4), whether the call is through a direct or transitive dependency relationship, and/or the lookup order defined by cache provider 420 (FIG. 4). As such, there are multiple cache settings in configurations 500, and configuration 514 is thus denoted as cache (1).

In many embodiments, consumer configurations 510 can include a persistence-provider node 515, which can root a subtree that includes configuration settings for when consumer 410 (FIG. 4) is using persistence provider 430 (FIG. 4). The subtree can include an environment node 516, under which there can be one or more configurations, such as configuration 517. In a number of embodiments, configuration 517 can be similar to hosts setting 461 (FIG. 4). In some embodiments, consumer configurations 510 can include a cache-provider node 518 under persistence-provider node 515. Cache-provider node 518 can root a subtree that includes configuration settings for when consumer 410 (FIG. 4) is using persistence provider 430 (FIG. 4), which is in turn using cache provider 420 (FIG. 4). In a number of embodiments, the subtree can include an environment node 519, under which there can be one or more configurations, such as configuration 520. In several embodiments, configuration 520 can be similar to cache setting 443 (FIG. 4), and can be the cache setting specified by consumer 410 (FIG. 4) when consumer 410 (FIG. 4) is using persistence provider 430 (FIG. 4), which is using cache provider 420 (FIG. 4). Configuration 520 can be denoted as cache (2).

In a number of embodiments, persistence-provider configurations 530 can include a persistence-provider node 531, which can be the root level node of persistence-provider configurations 530. In several embodiments, persistence-provider configurations 530 can include an environment node 532, under which there can be one or more configurations, such as configuration 533. In many embodiments, configuration 533 can be similar to security setting 451 (FIG. 4), and can be the security setting specified by persistence provider 430 (FIG. 4). In many embodiments, persistence-provider configurations 530 can include a cache-provider node 534. Cache-provider node 534 can root a subtree that includes configuration settings for when persistence provider 430 (FIG. 4) is using cache provider 420 (FIG. 4). In a number of embodiments, the subtree can include an environment node 535, under which there can be one or more configurations, such as configuration 536. In several embodiments, configuration 536 can be similar to cache setting 443 (FIG. 4), and can be the cache setting specified by persistence provider 430 (FIG. 4) when persistence provider 430 (FIG. 4) is using cache provider 420 (FIG. 4). Configuration 536 can be denoted as cache (3).

In a number of embodiments, cache-provider configurations 540 can include a cache-provider node 541, which can be the root level node of cache-provider configurations 540. In several embodiments, cache-provider configurations 540 can include an environment node 542, under which there can be one or more configurations, such as configuration 543. In many embodiments, configuration 543 can be similar to cache setting 441 (FIG. 4), and can be the cache setting specified by cache provider 420 (FIG. 4). Configuration 543 can be denoted as cache (4).

In many embodiments, cache-provider configurations 540 can include subtrees that include configurations for the different manners in which cache-provider 420 (FIG. 4) can be used. In several embodiments, cache-provider configurations 540 can include a consumer node 544, which can root a subtree that includes configuration settings specified by cache provider 420 (FIG. 4) for when consumer 410 (FIG. 4) is using cache provider 420 (FIG. 4). For example, cache-provider 540 can include a cache-provider node 545 under consumer node 544, which can root a subtree that includes configuration settings for when consumer 410 (FIG. 4) is directly using cache-provider 420 (FIG. 2). The subtree can include an environment node 546, under which there can be one or more configurations, such as configuration 547. In many embodiments, configuration 547 can be similar to cache setting 442 (FIG. 4), and can be the cache setting specified by cache provider 420 (FIG. 4) when consumer 410 (FIG. 4) is using cache provider 420 (FIG. 4). Configuration 547 can be denoted as cache (5).

In many embodiments, cache-provider configurations 540 can include a persistence-provider node 548 under consumer node 544, under which there can be a cache-provider node 549, which can root a subtree that includes configuration settings specified by cache provider 420 (FIG. 4) for when consumer 410 (FIG. 4) is using persistence provider 430 (FIG. 4), which is in turn using cache provider 420 (FIG. 4). In a number of embodiments, the subtree can include an environment node 550, under which there can be one or more configurations, such as configuration 551. In several embodiments, configuration 551 can be similar to cache setting 443 (FIG. 4), and can be the cache setting specified by cache provider 420 (FIG. 4) when consumer 410 (FIG. 4) is using persistence provider 430 (FIG. 4), which is using cache provider 420 (FIG. 4). Configuration 551 can be denoted as cache (6).

In a number of embodiments, cache-provider configurations 540 can include a persistence-provider node 552 under cache-provider node 541, under which there can be a cache-provider node 553, which can root a subtree that includes configuration settings specified by cache provider 420 (FIG. 4) for when persistence provider 430 (FIG. 4) is using cache provider 420 (FIG. 4). In several embodiments, the subtree can include an environment node 554, under which there can be one or more configurations, such as configuration 555. In several embodiments, configuration 555 can be similar to cache setting 443 (FIG. 4), and can be the cache setting specified by cache provider 420 (FIG. 4) when persistence provider 430 (FIG. 4) is using cache provider 420 (FIG. 4). Configuration 555 can be denoted as cache (7).

As shown in FIG. 5, configurations 500 can include multiple configurations for a single configuration setting type, such as the cache setting, with each configuration corresponding a different manner of usage, such as whether the call to cache provider 420 (FIG. 4) is through a direct or transitive dependency relationship, based on which component defines the cache setting, and based on which component or components are calling cache provider 420 (FIG. 4). The multiple different configurations can beneficially allow different configuration settings to be used in different situations. In many embodiments, the configuration resolution systems and methods described herein can use configurations 500 to determine the configuration settings. For example, in some embodiments, predefined configuration module 352 (FIG. 3) can store the configurations in configurations 500. It should be appreciated that configurations 500 is merely exemplary, and the tree structure can be modified commensurate to modifications in dependency graph 400 (FIG. 4).

In many embodiments, configuration determination module 353 (FIG. 3) can determine which configuration and/or configurations from among configurations 500 should be used. In many embodiments, input module 351 (FIG. 3) and/or output module 354 (FIG. 3) can provide one or more APIs to allow one or more components of the web application to access the configuration settings. In many embodiments, the APIs can allow the component to specify a configuration name and lookup order. The configuration name can be used to specify which configuration setting is being accessed. For example, the configuration name of "cache" can be used to specify the cache settings, such as configurations 514, 520, 536, 543, 547, 551, and 555. In many embodiments, the lookup order can be used to specify which configuration setting should be used, and/or which order of configuration settings should be used.

Table 1 shows an exemplary API for accessing configuration settings in accordance with the present disclosure. For example, a SCM (Service Configuration Management) class can include a routine named getConfiguation, which can take the configuration name (configName) and the lookup order (lookupOrder) as inputs, and can return a configuration. In a number of embodiments, the possible lookup orders can be enumerated, such as shown in Table 1. In many embodiments, the lookup orders can include default, client, final, provider, consumer, provider-consumer, and/or consumer-provider lookup orders, as described below in further detail. For example, a provider, such as cache provider 420 (FIG. 4) can use the cache setting, and can call SCM.getConfiguration(cache, lookupOrder) to determine the cache setting for a particular lookup order defined by cache provider 420 (FIG. 4).

TABLE 1

```
public class SCM {
    public Configuration getConfiguration(String configName,
        LookupOrder lookupOrder);
}
public enum LookupOrder {
    DEFAULT,
    CLIENT,
    FINAL,
    PROVIDER,
    CONSUMER,
```

TABLE 1-continued

```
        PROVIDER_CONSUMER,
        CONSUMER_PROVIDER
}
```

In many embodiments, the default lookup order can be the default selection when no other lookup order is specified. In a number of embodiments, the default lookup order can be similar or identical to the convention approach used for configurations in web applications. In many embodiments, the default lookup order can be the typical web application configuration use case, in which consumers define all of the configurations for every provider and their dependencies when provider has not provided reasonable defaults. In many embodiments, the default lookup order can provide backwards compatibility with conventional approaches.

In several embodiments, the client lookup order can determine the configuration defined by the client of the provider, or in other words, the immediate call of the provider. In such cases, the client (e.g., the immediate caller of the provider) can be expected to define the configuration. The client lookup order can be used for configuration settings that are expected to be defined solely by the client. In many embodiments, if the client fails to define the configuration, the application will fail. For example, persistence provider 430 (FIG. 4) can expect that consumer 410 (FIG. 4) will define the configuration for hosts setting 461 (FIG. 4), and can fail if consumer 410 (FIG. 4) does not provide the configuration for host setting 461 (FIG. 4).

In a number of embodiments, the final lookup order can use the configuration setting defined by the provider, which can be unable to be overridden by the consumer. In several embodiments, the final lookup order can be used when there is a universal common or default value for the configuration that the provider wants to define and manage. For example, persistence provider 430 (FIG. 4) can use the final lookup order when persistence provider 430 (FIG. 4) wants to use a particular encryption algorithm, such as SHA1 for security setting 451 (FIG. 4), as an enterprise policy for encrypting database credentials and does not want any consumer to override it.

In some embodiments, the provider lookup order can be used when the provider wants absolute control over the configuration used for each of its consumers. Unlike the final lookup order, which can use a generic default configuration defined by the provider for each of its callers, the provider lookup order can allow the provider to define the configurations separately for each of its callers.

In various embodiments, the consumer lookup order can be used when the provider expects the consumer to have defined the configuration. Unlike the client lookup order, which can use the configuration defined by the immediate caller of the provider, the consumer lookup order can be used to obtain the configuration from the consumer, which can be different in the case of transitive dependencies.

In many embodiments, the provider-consumer lookup order can be used when the provider defines reasonable configuration settings for each consumer, but allows consumers to override, if needed. In several embodiments, the provider-consumer lookup order can first look at the provider lookup order, then can look at the consumer lookup order. For example, a messaging provider can provide some default queue parameters for the consumer. The queues can be separate for each consumer, so the messaging provider can define them to have a unique name for each consumer. The messaging provider can set other default tuning parameters, which can then be customized by the consumers. If the consumer customizes the tuning parameters, those configuration setting can take effect at runtime. If the consumer does not define customized tuning parameters, the default tuning parameters defined by the messaging provider can be used.

In a number of embodiments, the consumer-provider lookup order can be the opposite of the provider-consumer lookup order, in that the provider can allow consumer defined configurations, but can override a consumer-defined configuration, if needed. In many embodiments, the consumer-provider lookup order can first look at the consumer lookup order, then can look at the provider lookup order. For example, a logging provider can allow consumers to tune the logging configuration settings, as needed by the consumer. Some consumers can choose to log at a lower-detailed level, such as INFO, and other consumers can choose to log at a higher-detailed level, such as DEBUG. During some periods of time, such as during the holidays, the amount of traffic on the web servers, such as web server 300, can result in network congestion in data centers or in the cloud. In such scenarios, the logging provider can want to have ultimate control, such as to throttle or turn off logging altogether until the network congestion issue is resolved. The logging provider can include a throttling feature that tunes for the cloud as needed, using the consumer-provider lookup order, to override the values defined by the consumers.

Figure 6:
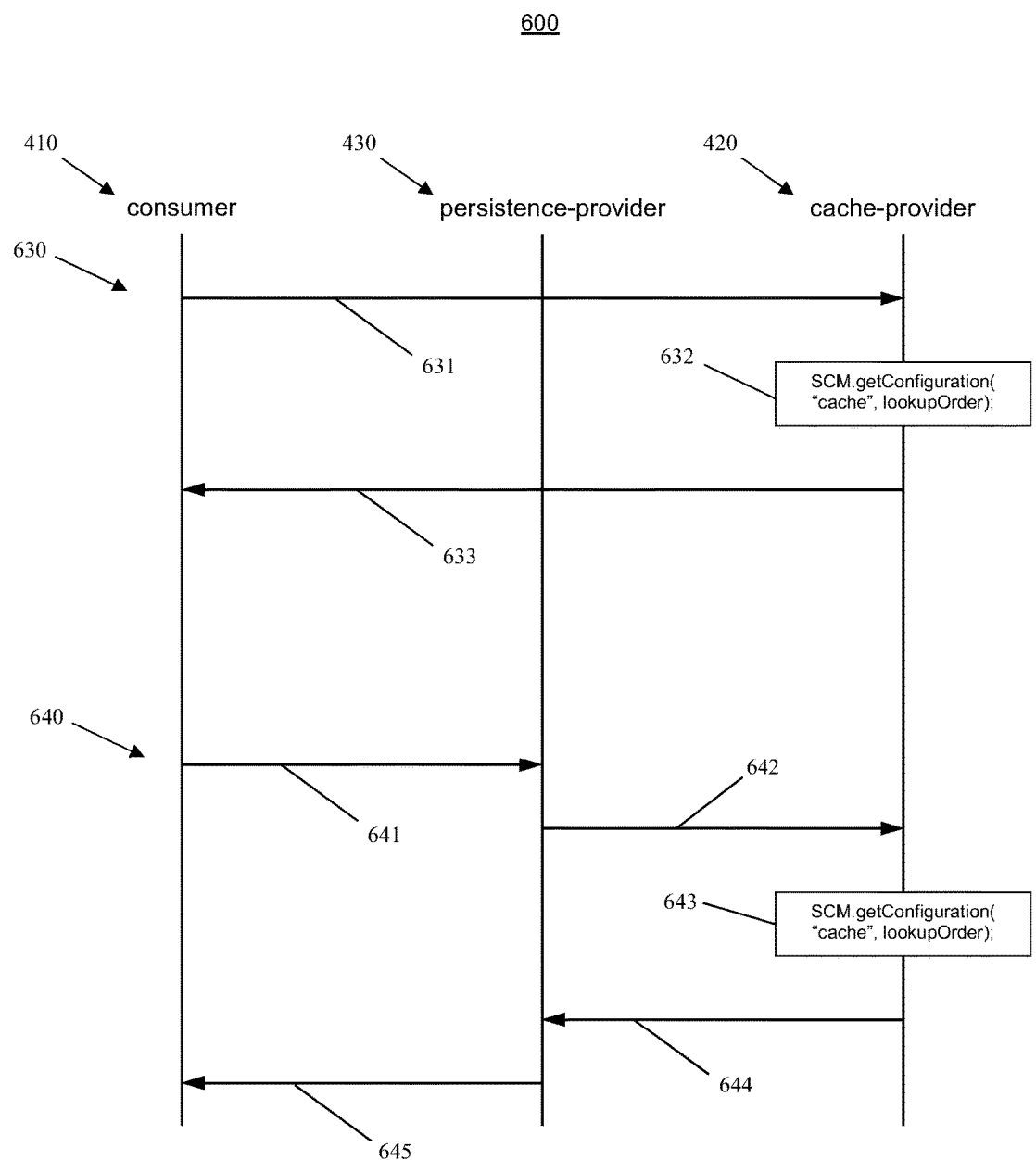
FIG. 6 illustrates a sequence diagram for calls by the cache provider of FIG. 4 to obtain the configuration for the cache setting.

Turning ahead in the drawings, FIG. 6 illustrates a sequence diagram 600 for calls by cache provider 420 to obtain the configuration for the cache setting. Sequence diagram 600 is merely exemplary, and embodiments of configuration resolution can be employed in many different embodiments or examples not specifically depicted or described herein. Sequence diagram 600 illustrates only the case of cache provider 420 making calls to obtain the configuration of the cache setting, and does not show calls made by any other provider and/or calls made to obtain the configuration for any other setting. In many embodiments, the calls made by cache provider 420 can occur through the direct dependency relationship, in which consumer 410 calls cache provider 420, or through the transitive dependency relationship, in which consumer 410 calls persistence provider 430, which in turn calls cache provider 420. In several embodiments, the configuration returned to cache provider 420 can be different based on whether cache provider 420 has been called through the direct dependency relationship or through the transitive dependency relationship.

Sequence diagram 600 can include a sequence 630, which can illustrate cache provider 420 making a call to obtain the cache configuration in a direct dependency relationship. Sequence 630 can include a call 631 from consumer 410 to cache provider 420. In sequence 630, consumer 410 is the consumer and the client of cache provider 420. Cache provider 420 can make a call 632 to get the configuration of the cache setting based on a lookup order defined by cache provider 420. In many embodiments, the configuration returned from call 632 can depend on the lookup order that is specified by cache provider 420. In many embodiments, cache provider 420 can perform one or more operations based on the configuration returned from call 632. In several embodiments, sequence 630 can include a response 633 from cache provider 420 to consumer 410, which can return control to consumer 410 after cache provider 420 has completed the processing resulting from call 631.

Sequence diagram 600 can include a sequence 640, which can illustrate cache provider 420 making a call to obtain the cache configuration in a transitive dependency relationship. Sequence 640 can include a call 641 from consumer 410 to persistence provider 430. Next, sequence 640 can include a call 642 from persistence provider 430 to cache provider 420. In sequence 640, consumer 410 is the consumer of cache provider 420, and persistence provider 430 is the client of cache provider 420. Cache provider 420 can make a call 643 to get the configuration of the cache setting based on a lookup order defined by cache provider 420. In many embodiments, the configuration returned from call 643 can depend on the lookup order that is specified by cache provider 420. In many embodiments, cache provider 420 can perform one or more operations based on the configuration returned from call 643. In several embodiments, sequence 640 can include a response 644 from cache provider 420 to persistence provider 430, and a subsequent response 645 from persistence provider to consumer 410, which can return control to consumer 410 after cache provider 420 has completed the processing resulting from call 642 and persistence provider 430 has completed the processing resulting from call 641.

In many embodiments, the configuration returned to cache provider 420 can be different in sequence 640 than in sequence 630. Table 2 summarizes the configuration outcomes for the direct dependency relationship of sequence 630 depicted in FIG. 6. Table 3 summarizes the configuration outcomes for the transitive dependency relationship of sequence 640 depicted in FIG. 6. As provided in Tables 2 and 3, the provider-consumer lookup order and the consumer-provider lookup order include a component from the provider lookup order, which is included in brackets for clarity to show that the outcome of the provider-consumer lookup order is the outcome of the provider lookup order overridden by the consumer lookup order, and the outcome of the consumer-provider lookup order is the outcome of the consumer lookup order overridden by the provider lookup order.

In some embodiments, the override operation can use the second configuration instead of the first configuration. For example, "cache (4) override with cache (5)," which can be the outcome of the provider lookup order for the direct dependency relationship, can result in cache (4) being used if cache (5) is not defined. But if cache (5) is defined, it can be used instead of cache (4).

TABLE 2

Outcomes for Direct Dependency

| Lookup Order | Returns |
| --- | --- |
| DEFAULT | cache (1) if exists, else cache (4) |
| CLIENT | cache (1) |
| FINAL | cache (4) |
| PROVIDER | cache (4) override with cache (5) |
| CONSUMER | cache (1) |
| PROVIDER_CONSUMER | [cache (4) override with cache (5)] override with cache (1) |
| CONSUMER_PROVIDER | cache (1) override with [cache (4) override with cache (5)] |

TABLE 3

Outcomes for Transitive Dependency

| Lookup Order | Returns |
| --- | --- |
| DEFAULT | cache (2) if exists, else cache (4) |
| CLIENT | cache (3) |
| FINAL | cache (4) |

TABLE 3-continued

Outcomes for Transitive Dependency

| Lookup Order | Returns |
| --- | --- |
| PROVIDER | cache (4) override with cache (7) override with cache (6) |
| CONSUMER | cache (2) |
| PROVIDER_CONSUMER | [cache (4) override with cache (7) override with cache (6)] override with cache (2) |
| CONSUMER_PROVIDER | cache (2) override with [cache (4) override with cache (7) override with cache (6)] |

In other embodiments, the override operation can include an aggregate and override operation, which can result in an aggregation of the settings that are not in conflict, and an override of the settings that are in conflict. For example, if cache (4) includes two settings, X=2 and Y=5, and cache (5) includes two settings, Y=4 and Z=7, then "cache (4) override with cache (5)" can result in the aggregation of the settings that are not in conflict, X=2 and Z=7, and Y=5 being overridden by Y=4, as those setting are in conflict, such that the resulting configuration is X=2, Y=4, and Z=7.

As a further explanation, consider sequence 640 for the transitive dependency relationship when cache provider 420 calls for the cache configuration 420 and sets the lookup order to consumer-provider. Configuration determination module 353 (FIG. 3) can determine the configuration to return to cache configuration 420 using configuration 500 (FIG. 5). Because the lookup order is consumer-provider, the consumer settings can be considered first. As such, configuration determination module 353 (FIG. 3) can look at the cache settings in consumer configurations 510 (FIG. 5). Because the call to cache provider 420 came through the persistence provider 430 in the transitive dependency relationship, configuration determination module 353 (FIG. 3) can descend the tree of consumer configurations 510 (FIG. 5) through persistence-provider node 515 and cache-provider node 518 (FIG. 5) to retrieve the cache setting, cache (2), in configuration 520 (FIG. 5).

In many embodiments, configuration determination module 353 (FIG. 3) can next consider the provider settings, first by looking at the default provider settings, then by looking at the provider settings for a call made by the client, and then by looking at the provider setting for a call made by the consumer through the client. As such, configuration determination module 353 (FIG. 3) can look at the cache settings in cache-provider configurations 540 (FIG. 5), starting at the default environment under environment node 542 (FIG. 5), which can retrieve the cache setting, cache (4), in configuration 543 (FIG. 5). In many embodiments, configuration determination module 353 (FIG. 3) can use cache (4) to override or, alternatively, to aggregate and override, cache (2), which can be denoted as (2+4). Next, for the client call, configuration determination module 353 (FIG. 3) can look at the cache settings under persistence provider node 552 (FIG. 5) and cache-provider node 553 (FIG. 5) to retrieve the cache setting, cache (7), in configuration 555 (FIG. 5). In many embodiments, configuration determination module 353 (FIG. 3) can use cache (7) to override or, alternatively, to aggregate and override, (2+4), which can in turn be denoted as (2+4+7). Next, for the consumer call through the client, configuration determination module 353 (FIG. 3) can look at the cache settings under consumer node 544, persistence-provider node 548, and cache-provider node 549 to retrieve the cache setting, cache (6), in configuration 551 (FIG. 5). In many embodiments, configuration determination module 353 (FIG. 3) can use cache (6) to override or, alternatively, to aggregate and override, (2+4+7), which can in turn be denoted as (2+4+7+6). Finally, configuration determination module 353 (FIG. 3) can return cache (2+4+7+6) to cache provider 420. This explanation is provided based on dependency graph 400 in FIG. 4 and the accompanying configurations 500 in FIG. 5. If the dependency graph instead included additional levels of dependency, such as an additional provider between consumer 410 (FIG. 4) and persistence provider 430 (FIG. 4), the provider lookup order can change accordingly to first look in the defaults of called provider, followed by the client, then the caller of the client, followed by the consumer. In other embodiments, the dependency chain can be many levels deep.

Figure 7:
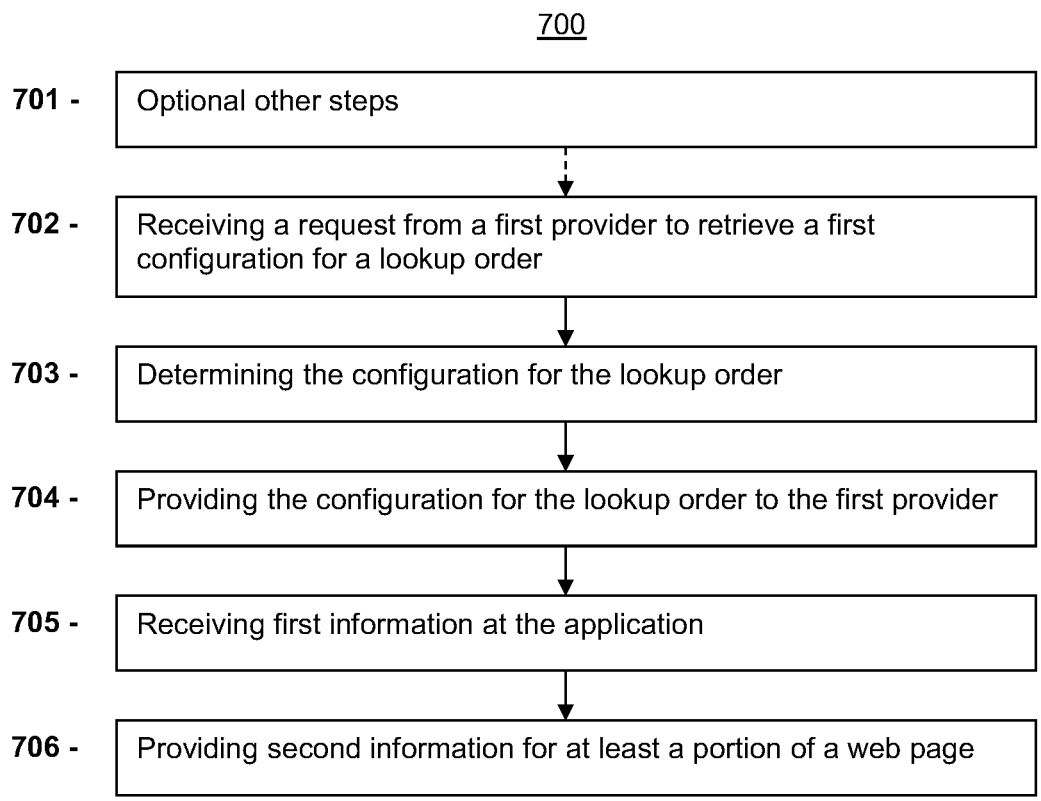
FIG. 7 illustrates a flow chart for a method of configuration resolution, according to another embodiment.

Turning ahead in the drawings, FIG. 7 illustrates a flow chart for a method 700 of configuration resolution, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In some embodiments, method 700 can be implemented by input module 351 (FIG. 3), predefined configuration module 352 (FIG. 3), configuration determination module 353 (FIG. 3), and/or output module 354 (FIG. 3).

Figure 8:
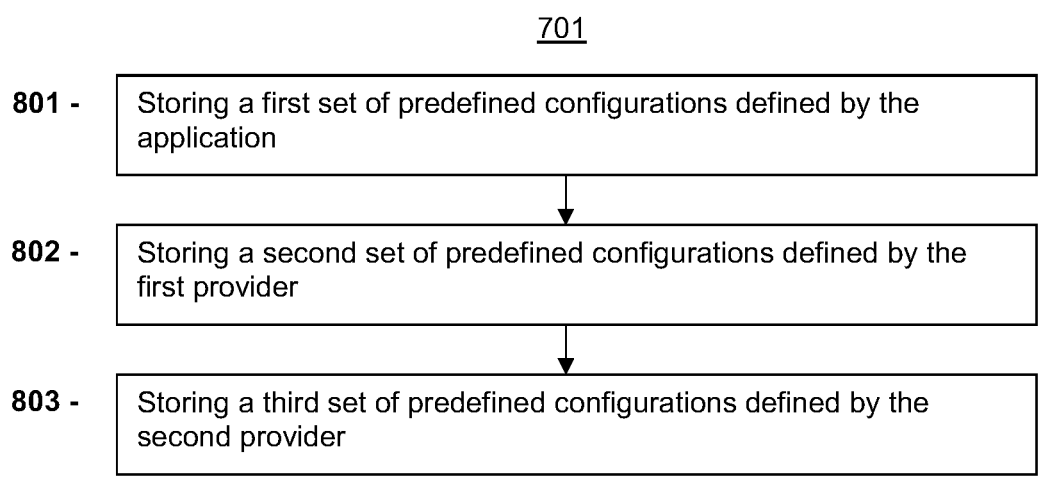
FIG. 8 illustrates a flow chart for a method of optional other steps, according to the embodiment of FIG. 7.

Referring to FIG. 7, in some embodiments method 700 can include a block 701 of optional other steps, as shown in FIG. 8 and described below. In some embodiments, method 700 can skip block 701 of option other steps.

In many embodiments, method 700 additionally can include a block 702 of receiving on a server a request from a first provider to retrieve a configuration for a lookup order. In several embodiments, the server can be similar or identical to web server 300 (FIG. 3). In a number of embodiments, the first provider can be similar or identical to first provider 320 (FIG. 3) and/or cache provider 420 (FIGS. 4, 6). In a number of embodiments, the first provider can be a first library. In some embodiments, the request can be received through an API, such as the getConfiguration API described above. In a number of embodiments, the first provider can be configured to be called directly by an application such that the application has a direct dependency relationship with the first provider. The application can be similar or identical to application 310 (FIG. 3) and/or consumer 410 (FIGS. 4, 6). In many embodiments, the application can be a web application. In other embodiments, the application can be a type of application different from a web application. In some embodiments, the first provider can be configured to be called by the application through a second provider such that the application has a transitive dependency relationship with the first provider through the second provider. The second provider can be similar or identical to persistence provider 430 (FIGS. 4, 6). In several embodiments, and the second provider can be a second library different from the first library. In various embodiments, the request from the first provider can be received when the first provider is called by the application through one of the direct dependency relationship or the transitive dependency relationship. In a number of embodiments, the lookup order can be a default lookup order, a client lookup order, a final lookup order, a provider lookup order, a consumer lookup order, a provider-consumer lookup order, and/or a consumer-provider lookup order.

In several embodiments, method 700 further can include a block 703 of determining the configuration for the lookup order using the server based at least in part on whether the call to the first provider by the application is through the direct dependency relationship or through the transitive dependency relationship. In a number of embodiments, block 703 can include determining the configuration for the lookup order by selecting the configuration from one of at least a first configuration and a second configuration different from the first configuration. For example, the first configuration can be one of the cache settings in configurations 500 (FIG. 5), and the second configuration can be another one of the cache settings in configurations 500 (FIG. 5). In a number of embodiments, block 703 can include determining a first configuration based on the lookup order, determining a second configuration different from the first configuration based on the lookup order, and generating the configuration by performing an aggregate and override operation on the first configuration using the second configuration. In some embodiments, the configuration can include one or more different configuration settings.

In a number of embodiments, method 700 additionally can include a block 704 of providing the configuration for the lookup order to the first provider. For example, the configuration can be returned in response to the getConfiguration API call.

In several embodiments, method 700 further can include a block 705 of receiving first information at the application that is based at least in part on the configuration for the lookup order. For example, the first provider can use the configuration that is received in processing the call to the first provider from the application that is received either through the direct dependency relationship or the transitive dependency relationship. The first provider can then return information in response to the call. The application can receive the first information from the first provider or from the second provider, which can be the information returned by the first provider, as in the case of the direct dependency relationship, or information based at least in part on the information returned by the first provider, as in the case of the transitive dependency relationship. The first information can be based at least in part based on the configuration returned to the first provider.

In a number of embodiments, method 700 additionally can include a block 706 of providing second information for at least a portion of a web page that is based at least in part on the first information. For example, the application can use the first information to determine second information, and display the second information on a portion of a web page. As another example, the application can use the first information to determine other information, which can be provided to one or more other applications, which can then be used to at least in part by the other applications to create second information that can be displayed on at least a portion of a web page.

Proceeding to the next drawing, FIG. 8 illustrates a flow chart for block 701 of optional other steps, according to an embodiment. Block 701 is merely exemplary and is not limited to the embodiments presented herein. Block 701 can be employed in many different embodiments or examples not specifically depicted or described herein. In some embodiments, the procedures, the processes, and/or the activities of block 701 can be performed in the order presented. In other embodiments, the procedures, the processes, and/or the activities of block 701 can be performed in any suitable order. In still other embodiments, one or more of the procedures, the processes, and/or the activities of block 701 can be combined or skipped. In various embodiments, block 701 can be performed prior to block 702 (FIG. 7) of receiving on a server a request from a first provider to retrieve a configuration for a lookup order.

In some embodiments, block 701 can include a block 801 of storing on the server a first set of predefined configurations defined by the application. For example, the first set of predefined configurations defined by the application can be similar or identical to consumer configurations 510 (FIG. 5). In some embodiments, the first set of predefined configurations defined by the application can include a first predefined configuration defined by the application for when the application is using the first provider. The first predefined configuration can be similar or identical to configuration 514 (FIG. 5). In some embodiments, the first set of predefined configurations defined by the application can include a second predefined configuration defined by the application for when the application is using the second provider. The second predefined configuration can be similar or identical to configuration 517 (FIG. 5). In some embodiments, the first set of predefined configurations defined by the application can include a third predefined configuration defined by the application for when the application is using the first provider through the second provider. The third predefined configuration can be similar or identical to configuration 520 (FIG. 5). In a number of embodiments, the first, second and third predefined configurations can be different from each other.

In some embodiments, block 701 additionally can include a block 802 of storing on the server a second set of predefined configurations defined by the first provider. For example, the second set of predefined configurations defined by the first provider can be similar or identical to cache-provider configurations 540 (FIG. 5). In some embodiments, the second set of predefined configurations defined by the first provider can include a fourth predefined configuration defined by the first provider for a first default usage of the first provider. The fourth predefined configuration can be similar or identical to configuration 543 (FIG. 5). In some embodiments, the second set of predefined configurations defined by the first provider can include a fifth predefined configuration defined by the first provider for when the application is using the first provider. The fifth predefined configuration can be similar or identical to configuration 547 (FIG. 5). In some embodiments, the second set of predefined configurations defined by the first provider can include a sixth predefined configuration defined by the first provider for when the application is using the first provider through the second provider. The sixth predefined configuration can be similar or identical to configuration 551 (FIG. 5). In some embodiments, the second set of predefined configurations defined by the first provider can include a seventh predefined configuration defined by the first provider for when the second provider is using the first provider. The seventh predefined configuration can be similar or identical to configuration 555 (FIG. 5). In a number of embodiments, the fourth, fifth, sixth, and seventh predefined configurations can be different from each other.

In a number of embodiments, block 701 further can include a block 803 of storing on the server a third set of predefined configurations defined by the second provider. For example, the third set of predefined configurations defined by the second provider can be similar or identical to persistence-provider configurations 530 (FIG. 5). In some embodiments, the third set of predefined configurations defined by the second provider can include an eighth predefined configuration defined by the second provider for a second default usage of the second provider. The eighth predefined configuration can be similar or identical to configuration 533 (FIG. 5). In some embodiments, the third set of predefined configurations defined by the second provider can include a ninth predefined configuration defined by the second provider for when the second provider is using the first provider. The ninth predefined configuration can be similar or identical to configuration 536 (FIG. 5). In a number of embodiments, the eighth and ninth predefined configurations can be different from each other.

In many embodiments, the predefined configurations of the first, second, and third sets of predefined configurations be defined prior to block 703 (FIG. 7) of determining the configuration for the lookup order. In many embodiments, the configuration can be defined after the administrator packages the application.

Returning to FIG. 7, in many embodiments, when the lookup order is the default lookup order, block 703 of determining the configuration for the lookup order can include: if the call to the first provider by the application is through the direct dependency relationship, determining the configuration is the first predefined configuration defined by the application for when the application is using the first provider; and if the call to the first provider by the application is through the transitive dependency relationship, determining the configuration is the third predefined configuration defined by the application for when the application is using the first provider through the second provider. In some embodiments, block 703 can further include: if the call to the first provider by the application is through the direct dependency relationship and the first predefined configuration for when the application is using the first provider is not defined, determining the configuration is the fourth predefined configuration defined by the first provider for the first default usage of the first provider; and if the call to the first provider by the application is through the transitive dependency relationship and the third predefined configuration for when the application is using the first provider through the second provider is not defined, determining the configuration is the fourth predefined configuration defined by the first provider for the first default usage of the first provider In several embodiments, when the lookup order is the client lookup order, block 703 of determining the configuration for the lookup order can include: if the call to the first provider by the application is through the direct dependency relationship, determining the configuration is the first predefined configuration defined by the application for when the application is using the first provider; and if the call to the first provider by the application is through the transitive dependency relationship, determining the configuration is the ninth predefined configuration defined by the second provider for when the second provider is using the first provider.

In several embodiments, when the lookup order is the final lookup order, block 703 of determining the configuration for the lookup order can include determining the configuration is the fourth predefined configuration defined by the first provider for the first default usage of the first provider.

In several embodiments, when the lookup order is the provider lookup order, block 703 of determining the configuration for the lookup order can include: if the call to the first provider by the application is through the direct dependency relationship, generating the configuration by performing an aggregate and override operation on the fourth predefined configuration defined by the first provider for the first default usage of the first provider using the fifth predefined configuration defined by the first provider for when the application is using the first provider; and if the call to the first provider by the application is through the transitive dependency relationship, generating the configuration by performing the aggregate and override operation on the fourth predefined configuration defined by the first provider for the first default usage of the first provider using the seventh predefined configuration defined by the first provider for when the second provider is using the first provider, and further performing the aggregate and override operation using the sixth predefined configuration defined by the first provider for when the application is using the first provider through the second provider.

In several embodiments, when the lookup order is the consumer lookup order, block 703 of determining the configuration for the lookup order can include: if the call to the first provider by the application is through the direct dependency relationship, determining the configuration is the first predefined configuration defined by the application for when the application is using the first provider; and if the call to the first provider by the application is through the transitive dependency relationship, determining the configuration is the third predefined configuration defined by the application for when the application is using the first provider through the second provider.

In several embodiments, when the lookup order is the provider-consumer lookup order, block 703 of determining the configuration for the lookup order can include: if the call to the first provider by the application is through the direct dependency relationship, generating the configuration by performing an aggregate and override operation on the fourth predefined configuration defined by the first provider for the first default usage of the first provider using the fifth predefined configuration defined by the first provider for when the application is using the first provider, and further performing the aggregate and override operation using the first predefined configuration defined by the application for when the application is using the first provider; and if the call to the first provider by the application is through the transitive dependency relationship, generating the configuration by performing the aggregate and override operation on the fourth predefined configuration defined by the first provider for the first default usage of the first provider using the seventh predefined configuration defined by the first provider for when the second provider is using the first provider, further performing the aggregate and override operation using the sixth predefined configuration defined by the first provider for when the application is using the first provider through the second provider, and further performing the aggregate and override operation using the third predefined configuration defined by the application for when the application is using the first provider through the second provider.

In several embodiments, when the lookup order is the consumer-provider lookup order, block 703 of determining the configuration for the lookup order can include: if the call to the first provider by the application is through the direct dependency relationship, generating the configuration by performing an aggregate and override operation on the first predefined configuration defined by the application for when the application is using the first provider using the fourth predefined configuration defined by the first provider for the first default usage of the first provider, and further performing the aggregate and override operation using the fifth predefined configuration defined by the first provider for when the application is using the first provider; and if the call to the first provider by the application is through the transitive dependency relationship, generating the configuration by performing the aggregate and override operation on the third predefined configuration defined by the application for when the application is using the first provider through the second provider using the fourth predefined configuration defined by the first provider for the first default usage of the first provider, further performing the aggregate and override operation using the seventh predefined configuration defined by the first provider for when the second provider is using the first provider, and further performing the aggregate and override operation using the sixth predefined configuration defined by the first provider for when the application is using the first provider through the second provider.

Returning to FIG. 3, in some embodiments, input module 351 can perform block 702 (FIG. 7) of receiving on a server a request from a first provider to retrieve a configuration for a lookup order. In several embodiments, predefined configuration module 351 can perform block 801 (FIG. 8) of storing on the server a first set of predefined configurations defined by the application, block 802 (FIG. 8) of storing on the server a second set of predefined configurations defined by the first provider, and/or block 803 (FIG. 8) of storing on the server a third set of predefined configurations defined by the second provider. In many embodiments, configuration determination module 353 can perform block 703 (FIG. 7) of determining the configuration for the lookup order using the server based at least in part on whether the call to the first provider by the application is through the direct dependency relationship or through the transitive dependency relationship. In various embodiments, output module 354 (FIG. 3) can perform block 704 (FIG. 7) of providing the configuration for the lookup order to the first provider.

Although configuration resolution has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 7-8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
receiving at a server a first request from a first provider to retrieve a first configuration for a first lookup order, the first provider is configured (a) to be called directly by an application such that the application has a direct dependency relationship with the first provider and (b) to be called by the application through a second provider such that the application has a transitive dependency relationship with the first provider through the second provider, the first request from the first provider is received when the first provider is called in a first call by the application through the direct dependency relationship, the first request comprising the first lookup order;
determining the first configuration for the first lookup order using the server based at least in part on both: (a) an ordering specified by the first lookup order, and (b) the first call to the first provider by the application being through the direct dependency relationship;
providing the first configuration to the first provider;
receiving at the server a second request from the first provider to retrieve a second configuration for a second lookup order, the second request from the first provider is received when the first provider is called in a second call by the application through the transitive dependency relationship, the second request comprising the second lookup order;
determining the second configuration for the second lookup order using the server based at least in part on both: (a) an ordering specified by the second lookup order, and (b) the second call to the first provider by the application being through the transitive dependency relationship, such that the first configuration can be different from the second configuration when the first lookup order is different from the second lookup order, and such that the first configuration can be different from the second configuration when the first lookup order is the same as the second lookup order; and
providing the second configuration to the first provider, wherein:
the first lookup order and the second lookup order each specify a specific ordering of one or more predefined configurations from which to determine configuration settings to be used based on the specific ordering.

2. The system of claim 1, wherein:
determining the first configuration for the first lookup order further comprises determining the first configuration for the first lookup order by selecting the first configuration from one of at least a third configuration and a fourth configuration different from the third configuration.

3. The system of claim 1, wherein:
determining the first configuration for the first lookup order further comprises:
determining a third configuration based on the first lookup order;
determining a fourth configuration different from the third configuration based on the first lookup order; and
generating the first configuration by performing an aggregate and override operation on the third configuration using the fourth configuration.

4. The system of claim 1, wherein:
the first configuration comprises one or more different configuration settings.

5. The system of claim 1, wherein:
the application is a web application;
the first provider is a first library; and
the second provider is a second library different from the first library.

6. The system of claim 1, wherein the computing instructions are further configured to perform:
before receiving the first request from the first provider to retrieve the first configuration for the first lookup order:
storing on the server a first set of predefined configurations defined by the application;
storing on the server a second set of predefined configurations defined by the first provider; and
storing on the server a third set of predefined configurations defined by the second provider.

7. The system of claim 6, wherein:
the first set of predefined configurations defined by the application comprises:
a first predefined configuration defined by the application for when the application is using the first provider;
a second predefined configuration defined by the application for when the application is using the second provider;
a third predefined configuration defined by the application for when the application is using the first provider through the second provider; and
the first, second and third predefined configurations are different from each other;
the second set of predefined configurations defined by the first provider comprises:
a fourth predefined configuration defined by the first provider for a first default usage of the first provider;
a fifth predefined configuration defined by the first provider for when the application is using the first provider;
a sixth predefined configuration defined by the first provider for when the application is using the first provider through the second provider;
a seventh predefined configuration defined by the first provider for when the second provider is using the first provider; and
the fourth, fifth, sixth, and seventh predefined configurations are different from each other; and
the third set of predefined configurations defined by the second provider comprises:
an eighth predefined configuration defined by the second provider for a second default usage of the second provider;
a ninth predefined configuration defined by the second provider for when the second provider is using the first provider; and
the eighth and ninth predefined configurations are different from each other.

8. The system of claim 7, wherein:
the first lookup order and the second lookup order are each a default lookup order;

determining the first configuration for the first lookup order comprises:
    determining the first configuration is the first predefined configuration defined by the application for when the application is using the first provider; and
determining the second configuration for the second lookup order comprises:
    determining the second configuration is the third predefined configuration defined by the application for when the application is using the first provider through the second provider.

9. The system of claim 8, wherein:
determining the first configuration for the first lookup order further comprises:
    when the first predefined configuration for when the application is using the first provider is not defined, determining the first configuration is the fourth predefined configuration defined by the first provider for the first default usage of the first provider; and
determining the second configuration for the second lookup order further comprises:
    when the third predefined configuration for when the application is using the first provider through the second provider is not defined, determining the second configuration is the fourth predefined configuration defined by the first provider for the first default usage of the first provider.

10. The system of claim 7, wherein:
the first lookup order and the second lookup order are each a client lookup order;
determining the first configuration for the first lookup order comprises:
    determining the first configuration is the first predefined configuration defined by the application for when the application is using the first provider; and
determining the second configuration for the second lookup order comprises:
    determining the second configuration is the ninth predefined configuration defined by the second provider for when the second provider is using the first provider.

11. The system of claim 7, wherein:
the first lookup order and the second lookup order are each a final lookup order;
determining the first configuration for the first lookup order comprises determining the first configuration is the fourth predefined configuration defined by the first provider for the first default usage of the first provider; and
determining the second configuration for the second lookup order comprises determining the second configuration is the fourth predefined configuration defined by the first provider for the first default usage of the first provider.

12. The system of claim 7, wherein:
the first lookup order and the second lookup order are each a provider lookup order; and
determining the first configuration for the first lookup order comprises:
    generating the first configuration by performing an aggregate and override operation on the fourth predefined configuration defined by the first provider for the first default usage of the first provider using the fifth predefined configuration defined by the first provider for when the application is using the first provider; and
determining the second configuration for the second lookup order comprises:
    generating the second configuration by performing the aggregate and override operation on the fourth predefined configuration defined by the first provider for the first default usage of the first provider using the seventh predefined configuration defined by the first provider for when the second provider is using the first provider, and further performing the aggregate and override operation using the sixth predefined configuration defined by the first provider for when the application is using the first provider through the second provider.

13. The system of claim 7, wherein:
the first lookup order and the second lookup order are each a consumer lookup order;
determining the first configuration for the first lookup order comprises:
    determining the first configuration is the first predefined configuration defined by the application for when the application is using the first provider; and
determining the second configuration for the second lookup order comprises:
    determining the second configuration is the third predefined configuration defined by the application for when the application is using the first provider through the second provider.

14. The system of claim 7, wherein:
the first lookup order and the second lookup order are each a provider-consumer lookup order;
determining the first configuration for the first lookup order comprises:
    generating the first configuration by performing an aggregate and override operation on the fourth predefined configuration defined by the first provider for the first default usage of the first provider using the fifth predefined configuration defined by the first provider for when the application is using the first provider, and further performing the aggregate and override operation using the first predefined configuration defined by the application for when the application is using the first provider; and
determining the second configuration for the second lookup order comprises:
    generating the second configuration by performing the aggregate and override operation on the fourth predefined configuration defined by the first provider for the first default usage of the first provider using the seventh predefined configuration defined by the first provider for when the second provider is using the first provider, further performing the aggregate and override operation using the sixth predefined configuration defined by the first provider for when the application is using the first provider through the second provider, and further performing the aggregate and override operation using the third predefined configuration defined by the application for when the application is using the first provider through the second provider.

15. The system of claim 7, wherein:
the first lookup order and the second lookup order are each a consumer-provider lookup order;
determining the first configuration for the first lookup order comprises:
    generating the first configuration by performing an aggregate and override operation on the first predefined configuration defined by the application for when the application is using the first provider using the fourth predefined configuration defined by the first provider for the first default usage of the first provider, and further performing the aggregate and override operation using the fifth predefined configuration defined by the first provider for when the application is using the first provider; and determining the second configuration for the second lookup order comprises:

generating the second configuration by performing the aggregate and override operation on the third predefined configuration defined by the application for when the application is using the first provider through the second provider using the fourth predefined configuration defined by the first provider for the first default usage of the first provider, further performing the aggregate and override operation using the seventh predefined configuration defined by the first provider for when the second provider is using the first provider, and further performing the aggregate and override operation using the sixth predefined configuration defined by the first provider for when the application is using the first provider through the second provider.

16. A method comprising:

receiving at a server a first request from a first provider to retrieve a first configuration for a first lookup order, the first provider is configured (a) to be called directly by an application such that the application has a direct dependency relationship with the first provider and (b) to be called by the application through a second provider such that the application has a transitive dependency relationship with the first provider through the second provider, the first request from the first provider is received when the first provider is called in a first call by the application through the direct dependency relationship, the first request comprising the first lookup order;

determining the first configuration for the first lookup order using the server based at least in part on both: (a) an ordering specified by the first lookup order, and (b) the first call to the first provider by the application being through the direct dependency relationship;

providing the first configuration to the first provider;

receiving at the server a second request from the first provider to retrieve a second configuration for a second lookup order, the second request from the first provider is received when the first provider is called in a second call by the application through the transitive dependency relationship, the second request comprising the second lookup order;

determining the second configuration for the second lookup order using the server based at least in part on both: (a) an ordering specified by the second lookup order, and (b) the second call to the first provider by the application being through the transitive dependency relationship, such that the first configuration can be different from the second configuration when the first lookup order is different from the second lookup order, and such that the first configuration can be different from the second configuration when the first lookup order is the same as the second lookup order; and providing the second configuration to the first provider, wherein:

the first lookup order and the second lookup order each specify a specific ordering of one or more predefined configurations from which to determine configuration settings to be used based on the specific ordering.

17. The method of claim 16, wherein:

determining the first configuration for the first lookup order further comprises determining the first configuration for the first lookup order by selecting the first configuration from one of at least a third configuration and a fourth configuration different from the third configuration.

18. The method of claim 16, wherein:

determining the first configuration for the first lookup order further comprises:

determining a third configuration based on the first lookup order;

determining a fourth configuration different from the third configuration based on the first lookup order; and generating the first configuration by performing an aggregate and override operation on the third configuration using the fourth configuration.

19. The method of claim 16, wherein:

the first configuration comprises one or more different configuration settings.

20. The method of claim 16, wherein:

the application is a web application;

the first provider is a first library; and the second provider is a second library different from the first library.

* * * * *